INVENTOR
*Philip A. Studer,*

Aug. 29, 1967   P. A. STUDER   3,338,048
VARIABLE INERTIA DRIVE MECHANISM
Original Filed Aug. 23, 1960   2 Sheets-Sheet 2

INVENTOR
Philip A. Studer,

3,338,048
VARIABLE INERTIA DRIVE MECHANISM
Philip A. Studer, Silver Spring, Md., assignor to Hamilton Watch Company, Lancaster, Pa., a corporation of Pennsylvania
Continuation of application Ser. No. 51,440, Aug. 23, 1960. This application Apr. 1, 1964, Ser. No. 358,140
20 Claims. (Cl. 58—28)

ABSTRACT OF THE DISCLOSURE

Disclosed is a drive mechanism for oscillating systems in which kinetic energy is added to the system by changing the inertia of an oscillating element. An electromagnet is mounted on or adjacent the balance wheel of a timepiece and is switched on and off in accordance with the rotary position of the balance wheel. The electromagnet moves a mass radially inward of the balance wheel axis of rotation at or near the point of maximum velocity of the balance wheel and this mass is returned to its initial position at or near the point of zero velocity of the balance wheel. The changes in rotary moment of inertia of the oscillating elements add net kinetic energy to drive the balance wheel.

---

This application is a continuation of copending application Ser. No. 51,440, filed Aug. 23, 1960.

This invention relates to a drive mechanism and more particularly relates to a variable inertia drive mechanism wherein a periodic change in inertia is used to restore the power consumed by friction in the drive system and by any load that may be on the device.

Almost everyone interested in ice skating has seen a figure skater perform a spin in which the arms are moved inwardly towards the skater's sides to increase the skater's speed of rotation and moved outwardly to slow it down. This increase in rotational velocity is caused by the overall change in the moment of inertia of the skater's body and is illustrated in many high school and college physics classes by the professor having a student spin on a piano stool or similar rotatable support. The student's speed of rotation, as with the ice skater, varies with the inward and outward movement of the arms.

The physical principle underlying this action may in one sense be considered from the standpoint that the inward movement of the arms increases the kinetic energy of the rotating body and that the skater or student must exert some effort, that is perform work, in order to move his arms inwardly against the centrifugal forces of rotation tending to throw his arms outwardly.

This principle has been used in the past as the basis of a governor device for a continuously rotating shaft. Insofar as applicant is aware it has not been used as a drive for rotating elements, probably because of the fact that any energy imparted to a rotating element with a radial inward change in the moment of inertia of the rotating element is returned upon outward movement as in the case of the skater and student described above, so that even neglecting losses the net energy imparted to the rotating element is zero.

The present invention is believed to provide for the first time a completely inanimate arrangement, that is a mechanism independent of a living creature, utilizing a change in rotational moment of inertia to increase the kinetic energy of a mass so as to drive the mass and perform useful work. This is accomplished through the provision of an oscillating mass, and a device preferably in the form of an electromagnet for changing the moment of inertia of the mass in a direction such as to increase its kinetic energy. Radial inward movement is most effective and least disturbing to the oscillations, particularly if the oscillations are isochronal, if the inward movement occurs at the point of maximum angular velocity. Because an oscillating device undergoes a slowing down and stopping of movement as distinguished from a continuously rotating element such as a shaft, the mass of the oscillating device may be returned to its initial position or condition (its original moment of inertia) during a time when it is moving slower or stopped, so that little or no energy is returned and the overall effect is a net transfer of substantial energy into the oscillating system.

A variable inertia drive mechanism constructed according to this invention may be used in a variety of ways. It may be used to drive a watch or clock, as a timing motor to drive a switching device, or it may be used to drive an oscillating output shaft for numerous other purposes. If provided with a suitable converter the oscillating output may be converted into a unidirectional drive. Also the electromagnetic nature of the preferred embodiment makes possible the utilization of the device as a source of accurately timed electrical impulses. The inertial drive makes possible a relatively simple, inexpensive device particularly suited for aerospace work. Additional advantages include a simpler and more reliable contact system, a standard coil form, and a symmetrical arrangement of components. In addition, if desired the contact and consequently the drive pulse to the system can be made in both directions of the wheel's rotation rather than only once each complete oscillation as employed in many previous asymmetrical watch and clock drives.

While the balance assembly of conventional timepieces is adapted to effect isochronal oscillation of the balance wheel in each direction, energy lost through friction in both mechanically and electrically operated timepieces makes impossible the attainment of perfect isochronism. Since less than perfect isochronal oscillation of the balance assembly results in imperfect timekeeping, this condition is not particularly desirable.

It is accordingly a primary object of this invention to provide a novel drive mechanism.

Another object of the invention is to provide a variable inertia drive mechanism.

Another object of the invention is to provide a mechanism for imparting energy to oscillating systems by periodically changing the moment of inertia of such systems.

Another object of the present invention is to provide novel balance assemblies for a timepiece which have more perfect isochronal movement than those of known timepieces.

It is another object of the present invention to provide a novel timepiece having a variable inertia drive mechanism in which an electrical impulse is transformed into a change in inertia of an oscillating member.

It is another object of the invention to provide an electrically operated horological device with a greatly simplified contact or switching mechanism system.

It is still another object of the invention to provide a constant frequency signalling device in which a controlled change in inertia of an oscillating body is used to maintain the constant frequency.

These and further objects and advantages of the present invention shall become more apparent upon reference to the following specification, claims and appended drawings wherein:

Figure 1:
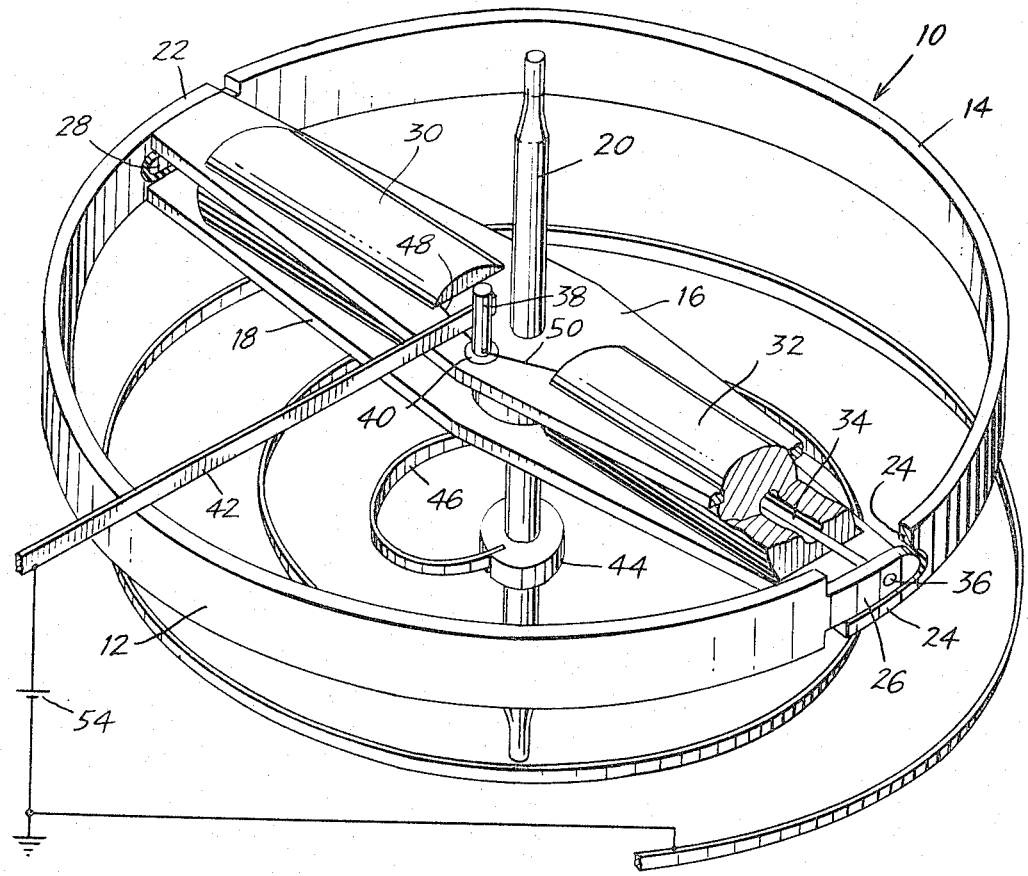
FIGURE 1 is a partially schematic, perspective view of the drive mechanism of the present invention, with parts broken away for purposes of clarity.

As is clearly shown in FIGURE 1, the structure of one embodiment of the present invention comprises a balance wheel indicated generally at 10 and composed of a two-piece split rim, the rims beings indicated at 12 and 14. Rims 12 and 14 are fixedly attached to opposite ends of a crossarm member consisting of an upper spoke 16 and a lower spoke 18. Spokes 16 and 18 are fixedly mounted for rotation with balance staff 20, which is supported in jewelled bearings (not shown) in the customary manner.

Rim 12 is provided with a bifurcated end 22, the upper furcation of which is attached to one end of spoke 16, the lower furcation of which is attached to spoke 18. Rim 14 is also provided with a bifurcated end 24 (a portion of which is broken away for purposes of clarity), the furcations of which are respectively secured to the other ends of spokes 16 and 18. Rims 12 and 14 have tongued extensions 26 and 28, respectively, each of which extends between the furcations of the bifurcated end of the other rim.

Spokes 16 and 18 are recessed to receive the drive coils of a pair of solenoids 30 and 32 which are arranged in symmetrical relation with respect to the balance staff 20. Each solenoid has a core member 34, only one of which is shown in the drawing. Each of core members 34 is fixedly attached to the adjacent tongued extension, one of said core members being shown to be attached at 36 to the tongued extension 26.

Upper spoke 16 carries a contact pin 38 which is insulated from the spoke by an insulating bushing 40. Contact pin 38 is adapted to be engaged by a fixed, elongated contact spring 42. Spring 42 is carried by an insulated post (not shown) in the frame of the assembly.

A collet 44 is fixedly attached to the balance staff 20 for rotation therewith. A flat wire torsion spring or hairspring 46 is inserted into a slot in collet 44 as is customary in the watchmaking art, hairspring 46 being adjustable to change its effective length in the usual manner by means of a regulator (not shown).

A pair of insulated electrical leads 48 and 50 interconnect the contact pin 38 with each of the solenoids 30 and 32. The other ends of the coils of solenoids 30 and 32 may electrically be connected through hairspring 46 in a conventional manner to complete an electrical circuit to an electrical source such as battery 54 as shown schematically in the drawing.

The operation of the foregoing embodiment of the variable inertia drive mechanism of the instant invention is as follows:

The balance wheel and staff assembly is turned to oscillate at a given frequency determined by the strength of hairspring 46 and the mass of the balance wheel assembly. Each time the balance wheel assembly passes the neutral or rest position, insulated pin 38 strikes the fixed elongated contact spring 42, thereby completing the electrical circuit through the drive coils and pulling the solenoid core elements 34 radially inwardly towards balance staff 20. In so doing, the moment of inertia of the system about the staff is diminished and rotary motion of the entire assembly is accelerated. This results in an increase in the angular velocity of the balance wheel, which restores the energy lost due to friction in the oscillation of the balance staff 20, and whatever energy is given up to the load (i.e., the timepiece train) in the case of the electric timepiece.

It will be understood that the shape or configuration of the crossarms is immaterial and that while two elements have been shown, a single element may be used. A two element, skeletonized crossarm is preferred in order to minimize the mass of the rotating assembly and to thus accentuate the change in inertia effected by moving the ends of the rims inwardly.

Figure 2:
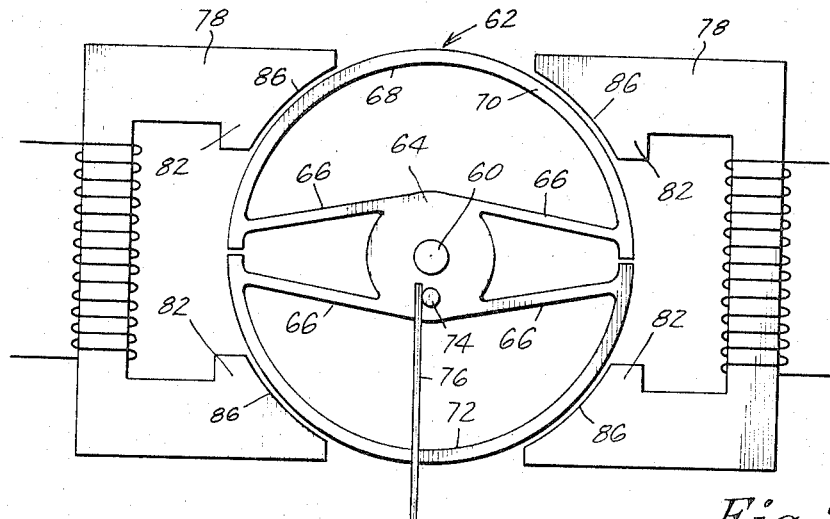
FIGURES 2 and 3 are top plan views of modified forms of the drive mechanism of FIGURE 1.
Figure 3:
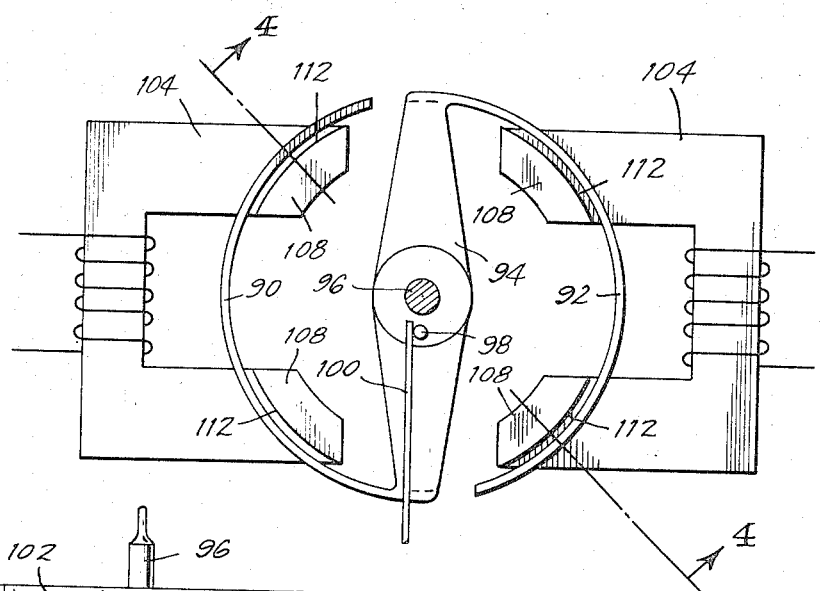
Figure 4:
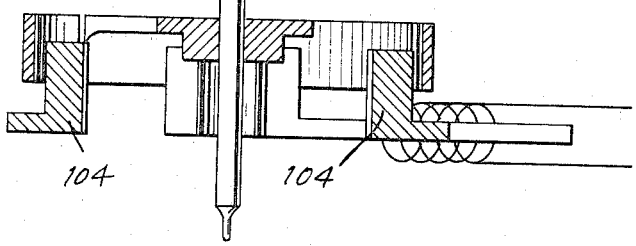
FIGURE 4 is a sectional view taken through lines 4—4 in FIGURE 3.

Additional forms of variable inertia drive mechanisms, in which the drive mechanism is in the form of fixed electromagnets separate from the oscillating balance assembly, are illustrated in FIGURES 2-4.

In the first of these, the mechanism illustrated in FIGURE 2, a balance staff 60, mounted for oscillation in a conventional manner, supports a balance wheel indicated generally at 62 and having a hub portion 64, flexible spokes 66 and a rim 68. Rim 68 is constructed of ferromagnetic material and, as illustrated, is divided into two sections, 70, and 72 each one of which is supported at its ends by two flexible spokes 66. Hub portion 64 supports a contact post 74 which is adapted to engage a fixed flexible contact arm 76 during oscillation of balance wheel 62 in a conventional manner. A hairspring (not shown) is also attached at one end to balance staff 60 in a known manner as in the embodiment of FIGURE 1.

The drive mechanism is equipped with two electromagnets 78 each having two pieces 82 with arcuate surfaces 86 to conform to the curvature of rim sections 70 and 72 of balance wheel 62. As may be seen in FIGURE 2, arcuate surfaces 86 of the electromagnets are spaced from but positioned adjacent to the outer edge of rim sections 70 and 72.

Contact arm 76, contact post 74 and the electromagnet coils are placed in electrical communication with one another in the usual manner.

In essence, the operation of the structure illustrated in FIGURE 2 is similar to that described above in connection with the structure shown in FIGURE 1. Rather than being drawn inwardly toward balance staff 60 at the moment of energization of the electromagnets as was the case in connection with the embodiment shown in FIGURE 1, however, rim sections 70 and 72 are drawn outwardly at the moment of energization, flexible arms 66 permitting such outward movement as will be apparent. When the electromagnets are deenergized, the spring bias of flexible arms 66 will induce rim sections 70 and 72 to return to their normal positions and, as these sections move inwardly toward balance staff 60, the moment of inertia of the system about the staff will be diminished as heretofore described and rotary motion of the entire assembly will be accelerated as before. This will again result in an increase in the angular velocity of the balance wheel, which will restore the energy lost due to friction in the oscillation of the balance staff and whatever energy is given up to the load.

Since it is desirable to induce the balance assembly to accelerate at the point of greatest angular velocity, contact arm 76 and contact post 74 should be positioned relative to one another so that energization of the electromagnets takes place at a point other than the neutral or rest position of the balance assembly, preferably at a point closer to the end limits of oscillation of the assembly. In this manner, rim sections 70 and contact post 74 should be positioned relative to one another so that energization of the electromagnets takes place at a point other than the neutral or rest position of the balance assembly, preferably at a point closer to the end limits of oscillation of the assembly. In this manner, rim sections 70 and 72 will, relatively speaking, be drawn inwardly toward balance staff 60 as the assembly approaches its rest position and the effect in the variation in the moment of inertia of the system will be substantially identical to that described above in connection with the system of FIGURE 1.

If desired, of course, the system of FIGURE 1 could be modified to operate similarly to that of FIGURE 2 by modifying the commutation system of the former in an obvious manner.

In the form of the invention illustrated in FIGURES 3 and 4, a structure similar to that shown in FIGURE 1 is utilized, including a two piece rim 90 and 92 constructed of ferromagnetic material and cantilevered on a crossarm 94 which is suitably mounted for oscillation on a balance staff 96. Mounted on crossarm 94 is a contact post 98 adapted to engage a flexible contact arm 100 during the oscillation of balance staff 96 in the manner previously described. Balance staff 96 is also connected to a hairspring 102 in a conventional manner.

Connected in circuit with contact pin 98 and contact arm 100 in a known manner are two electromagnets 104, each of which has upstanding arms 108 having convex sides 112 to conform to the configuration of the inside of rim sections 90 and 92 as shown in FIGURE 3.

The operation of the structure shown in FIGURES 3 and 4 does not differ in essence from that described above in connection with the device in FIGURE 1. As the balance wheel assembly passes the neutral or rest position, insulated pin 98 strikes contact spring 100, completing the electrical circuit through electromagnets 104 and pulling rim sections 90 and 92 inwardly toward balance staff 96. As before, the moment of inertia of the system about the staff will be diminished and the angular velocity of the balance wheel will increase to restore the energy lost due to friction and to the load during the oscillation of the balance staff.

The movable portions of the inertial assemblies described above do not necessarily have to move sinusoidally as a simple spring mass system. If desired, the residual magnetism of the system may be utilized to hold the mass in the inward position for approximately one-quarter of an oscillation cycle, after which the rim sections would move rapidly outwardly at a point at which little or no energy would be lost to the oscillating system. Such an effect may be utilized either in the systems illustrated in FIGURE 1 or in FIGURES 3 and 4.

It will be apparent that the variable inertia drive mechanisms of the present invention are extremely unique in their operation and provide a truly effective constant frequency source. While the devices will find their primary application in the timepiece field, they are equally well suited for use as signalling or triggering devices, or as mechanisms in which a constant frequency source is required. Thus, they may be used to provide a source of timed electrical pulses, the electrical load being placed in series or in parallel with the solenoid drive coils.

The construction of the drive mechanisms is compact and easily assembled. In addition, the switching means utilized in the instant devices are much simpler than comparable means in currently available electric timepieces. The novel structures of the present invention also effectively permit the use of a drive pulse in both directions of oscillation of the balance assembly. In each of the embodiments disclosed oscillations may be initiated or started in any manner well known in the electric watch and clock fields such as by physically impulsing or pushing the balance wheel, either manually (as by means of a setting stem) or electrically (by means of a separate solenoid for that purpose).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A variable inertia drive mechanism comprising a rotatably mounted wheel, spring means coupled to said wheel whereby said wheel oscillates between the maximum compressed and maximum expanded positions of said spring means, an electromagnet having a radially movable core mounted on said wheel, and an electrical energizing circuit for said electromagnet including a movable contact carried by said wheel and a yieldable contact in the path of movement of said movable contact.

2. A drive mechanism according to claim 1 wherein said contacts meet at the neutral position of said spring means.

3. A variable inertia drive mechanism comprising a balance wheel rotatably mounted on a balance staff, a hairspring coupled to said balance staff, an electromagnet having a radially movable core mounted on said balance wheel, said core moving radially inward of said balance wheel when said electromagnet is energized to reduce the moment of inertia of said balance wheel, and an electrical energization circuit for said electromagnet including a movable contact carried by said balance wheel and a yieldable contact in the path of movement of said movable contact.

4. A variable inertia drive mechanism comprising a balance wheel rotatably mounted on a balance staff, a hairspring coupled to said balance staff, a pair of electromagnets symmetrically mounted on said balance wheel on opposite sides of said balance staff, each of said electromagnets having a core movable from a radial outward to a radail inward position with respect to said balance wheel when its electromagnet is energized, spring means for returning each of said cores to its radial outward position when said electromagnets are deenergized, and means for energizing said electromagnets over at least approximately the last quarter of each oscillation of said balance wheel.

5. A drive according to claim 4 including means for energizing said electromagnets over approximately the last half of each half cycle of said balance wheel.

6. A variable inertia drive mechanism comprising an oscillatable shaft; a crossarm member carried by said shaft; a first rim member attached at one end to one end of said crossarm member and free at its other end; a second rim member attached to the other end of said crossarm member and free at its other end; the free ends of said rim members being substantially diametrically opposed; means carried by said crossarm member engaging the free ends of said rim members to pull said free ends inwardly periodically during oscillation of said shaft to decrease the moment of inertia of said shaft-supported elements about said shaft; and means associated with said shaft for storing and releasing energy produced by movement of said free ends inwardly thereby causing said shaft to oscillate.

7. A variable inertia drive mechanism comprising an oscillatable shaft; a crossarm member carried by said shaft; a first arcuate rim member attached at one end to one end of said crossarm member and free at its other end; a second arcuate rim member attached to the other end of said crossarm member and free at its other end; the free ends of said arcuate rim member being substantially diametrically opposed; means carried by said crossarm member engaging the free ends of said arcuate rim members; switch means activating said free end-engaging means to pull said free ends inwardly each time said shaft oscillates through a rest position; and means associated with said shaft for storing and releasing energy produced by movement of the ends of said arcuate rim when said solenoids are energized thereby causing said shaft to oscillate.

8. A variable inertia drive mechanism as set out in claim 7 wherein said switch means comprises an insulated contact pin carried by said crossarm member; a fixed elongated contact spring engageable with said contact pin; and means closing an electrical circuit upon engagement of said contact pin and contact spring.

9. A variable inertia drive mechanism comprising an oscillatable shaft; a crossarm member carried by said shaft; an arcuate rim attached to each end of said crossarm member; a pair of solenoids symmetrically supported by said crossarm member; said solenoids having their core members fixedly attached to the ends of each arcuate rim member opposite the end attached to said crossarm member; means to energize said solenoids each time said shaft oscillates through a rest position to move said core members inwardly toward said shaft; and means associated with said shaft for storing and releasing energy produced by movement of the ends of said arcuate rim when said solenoids are energized thereby causing said shaft to oscillate.

10. A variable inertia drive mechanism as set out in claim 9 wherein each arcuate rim is bifurcated at the end attached to said crossarm member and has a tongued end opposite said bifurcated end extending into the bifurcated end of the other arcuate rim.

11. A variable inertia drive mechanism comprising an oscillatable shaft; a crossarm member carried by said shaft; a first rim member attached at one end to one end of said crossarm member and free at its other end; a second rim member attached to the other end of said crossarm member and free at its other end; the free ends of said rim members being substantially diametrically opposed; means associated with said rim members for moving the free ends of said rim members inwardly towards said shaft over a portion of the angular path traversed by the shaft during its oscillation; means for moving said free ends outwardly away from said shaft over another portion of said angular path; inward movement of said free ends decreasing the moment of inertia of said shaft-supported elements about said shaft; and means associated with said shaft for storing and releasing energy produced by the movement of said first and second masses thereby causing said shaft to oscillate.

12. A variable inertia drive mechanism comprising an oscillatable shaft; a rimmed member having first and second sections movable relative to one another and mounted on said shaft with said rim sections being substantially symmetrically positioned relative to said shaft; means associated with said rim sections for moving them inwardly towards said shaft over a portion of the angular path traversed by the shaft during its oscillation; means for moving said rim sections outwardly away from said shaft over another portion of said angular path; inward movement of said rim sections decreasing the moment of inertia of said shaft-supported elements about said shaft; and means associated with said shaft for storing and releasing energy produced by the movement of said first and second masses thereby causing said shaft to oscillate.

13. A drive mechanism comprising a mass mounted for sustained oscillatory movement, and means coupled to said mass for changing its inertia at two predetermined spaced points in a cycle of oscillation, said means decreasing the inertia of said mass at a first point and increasing the inertia of said mass at a second point of lesser velocity than said first point whereby net kinetic energy is imparted to said mass.

14. A drive mechanism according to claim 13 wherein said mass is mounted for rotary oscillations, and said means changes the rotary moment of inertia of said mass.

15. A drive mechanism comprising a mass mounted for sustained rotary oscillations, said mass including electromagnetic means for changing its rotary moment of inertia, and switch means coupled to said mass for actuating said electromagnetic means in accordance with the position of said mass in the cycle of oscillation, said electromagnetic means decreasing the rotary moment of inertia of said mass when said mass is in a first position and increasing said rotary moment of inertia when said mass is in a second position, said second position being located at a point relative to said first position at which said mass possesses a lesser angular velocity during a normal cycle of oscillation whereby net kinetic energy is imparted to said mass.

16. A drive mechanism according to claim 15 wherein said mass forms a part of a horological balance system.

17. A variable inertia drive system comprising a mass mounted for rotary oscillations, resilient means coupled to said mass for sustaining oscillations of said mass, and means coupled to said mass for changing its rotary moment of inertia at two predetermined spaced points in a cycle of oscillation, said means decreasing the rotary moment of inertia of said mass at a first point and increasing the rotary moment of inertia of said mass at a second point of lesser velocity than said first point whereby net kinetic energy is imparted to said mass.

18. A drive mechanism according to claim 17 wherein said mass comprises a balance wheel of a timepiece, and said resilient means is a spring coupled to said balance wheel.

19. A variable inertia drive mechanism comprising a body rotatably mounted for angular oscillating movement on a shaft, spring means coupled to said body for sustaining periodic angular oscillations of said body, a mass movably mounted on said body, and electromagnetic means responsive to a predetermined position of said body for acting on said mass to move said mass radially of said shaft, said electromagnetic means moving said mass radially inward toward said shaft at approximately the point of maximum angular velocity of said body, and means coupled to said body for returning said mass to its initial position at approximately the point of zero velocity of said body.

20. A drive mechanism according to claim 19 including a pair of said masses equally spaced on diametrically opposite sides of the rotary axis of said shaft.

References Cited
UNITED STATES PATENTS

| | | | |
|---|---|---|---|
| 203,623 | 5/1878 | Jay | 74—572 |
| 444,081 | 1/1891 | Wright | 74—573 |
| 2,603,103 | 7/1952 | Sohon et al. | 74—572 |
| 3,248,967 | 5/1966 | Lewis | 74—572 |

MILTON O. HIRSHFIELD, *Primary Examiner.*

D. F. DUGGAN, *Assistant Examiner.*